March 23, 1948.   L. A. DICKENS   2,438,154
HILL-HOLDING BRAKE DEVICE
Filed May 13, 1946   3 Sheets-Sheet 1

INVENTOR,
Lonnie A. Dickens,
BY
ATTORNEY.

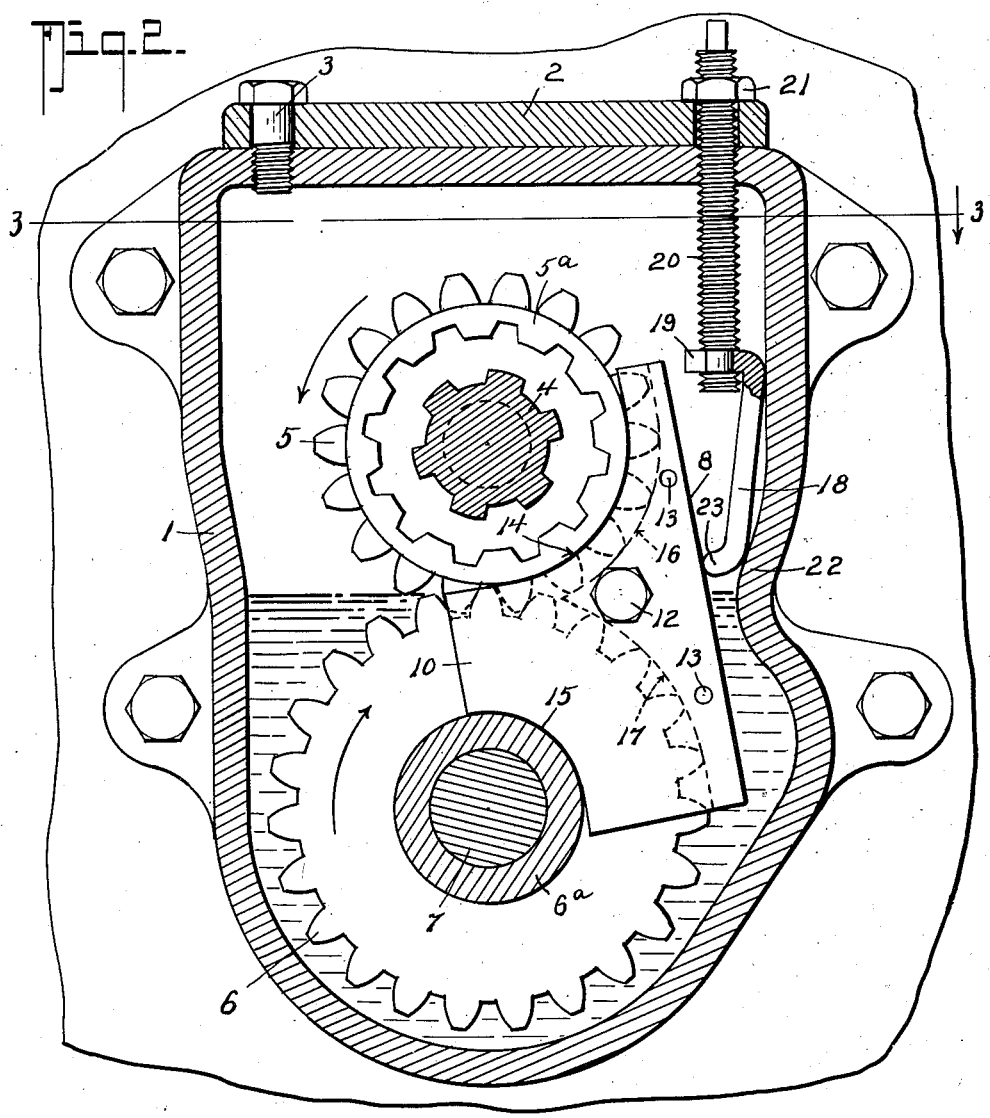

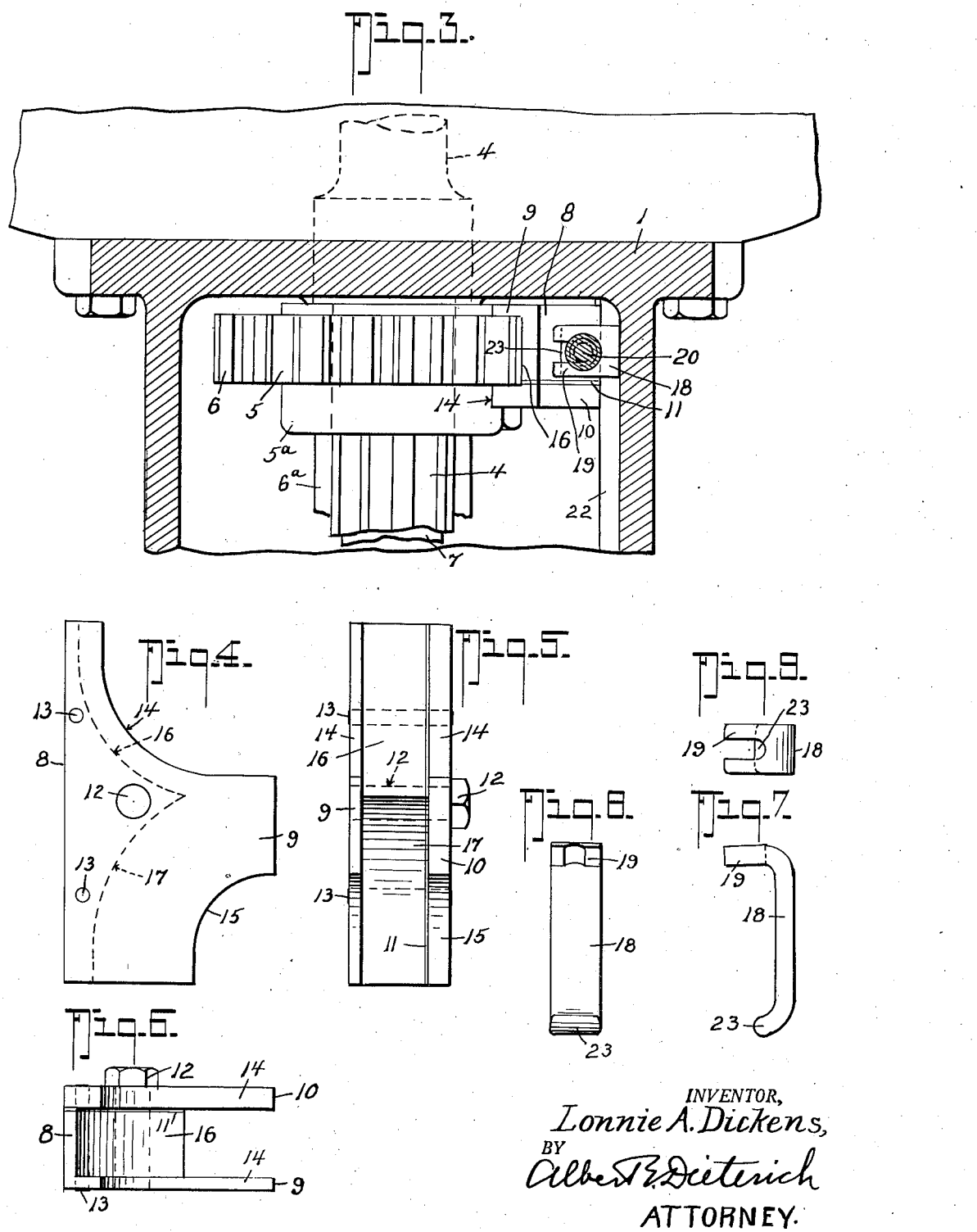

Patented Mar. 23, 1948

2,438,154

UNITED STATES PATENT OFFICE 2,438,154

HILL-HOLDING BRAKE DEVICE

Lonnie A. Dickens, High Point, N. C.

Application May 13, 1946, Serial No. 669,356

2 Claims. (Cl. 192—4)

My invention relates to so-called "no roll" or hold back devices for preventing an automobile from moving backwardly on a hill after having stopped and while again being started up.

Generically the invention seeks to provide a device which can be installed in a conventional automobile transmission and will cause the transmission to function as a one way hydraulic brake and prevent the vehicle from moving backward when the transmission is set in a forward position and also when set in a reverse position.

In driving a conventional automobile it is difficult to prevent the car from rolling down-hill when starting up on an incline, for as the foot is removed from the brake to manipulate the throttle the car starts to roll before the engine can be accelerated and the clutch engaged. Due to the inertia of the car moving in the opposite direction from that desired and the increased load because of the incline it is often difficult to engage the clutch without stalling the engine or jerking the car. This has long been considered a source of great annoyance and numerous contrivances have been devised and some used to some extent to overcome it. It seems that all methods devised have been impractical either because they were too complex and therefore too expensive, or they were too fragile or they would not perform all the functions desired.

It is therefore the intent and purpose of this invention to provide a simple, inexpensive, and rugged means of performing the above mentioned functions which can be built as an accessory and can be adapted to any conventional transmission assembly without changing the fundamental design of that assembly. This device, as will be seen from the accompanying drawings and the following description, will, due to the inherent design of the transmission, reverse its action in relationship to the movement of the car as the transmission setting is reversed and it will require no adjusting as all braking action is hydraulic.

Other objects will in part be obvious and in part be pointed out hereinafter.

To the attainment of the aforesaid objects and ends, invention also resides in the novel details of construction, combinations and arrangements of parts which will first be described in detail and then be specifically pointed out in the appended claims, reference being had to the accompanying drawings in which—

Fig. 2 is a cross section on the line 2—2 of Fig. 1.

Fig. 3 is a detail horizontal section on the line 3—3 of Fig. 2.

Fig. 4 is a side elevation of the brake body.

Fig. 5 is an elevation of the same looking from right to left in Fig. 4.

Fig. 6 is a top plan view of the same.

Fig. 7 is a side elevation of the brake body holding or locking device.

Fig. 8 is an elevation of the same looking from left to right in Fig. 7.

Fig. 9 is a top plan view of the same.

Figure 1:
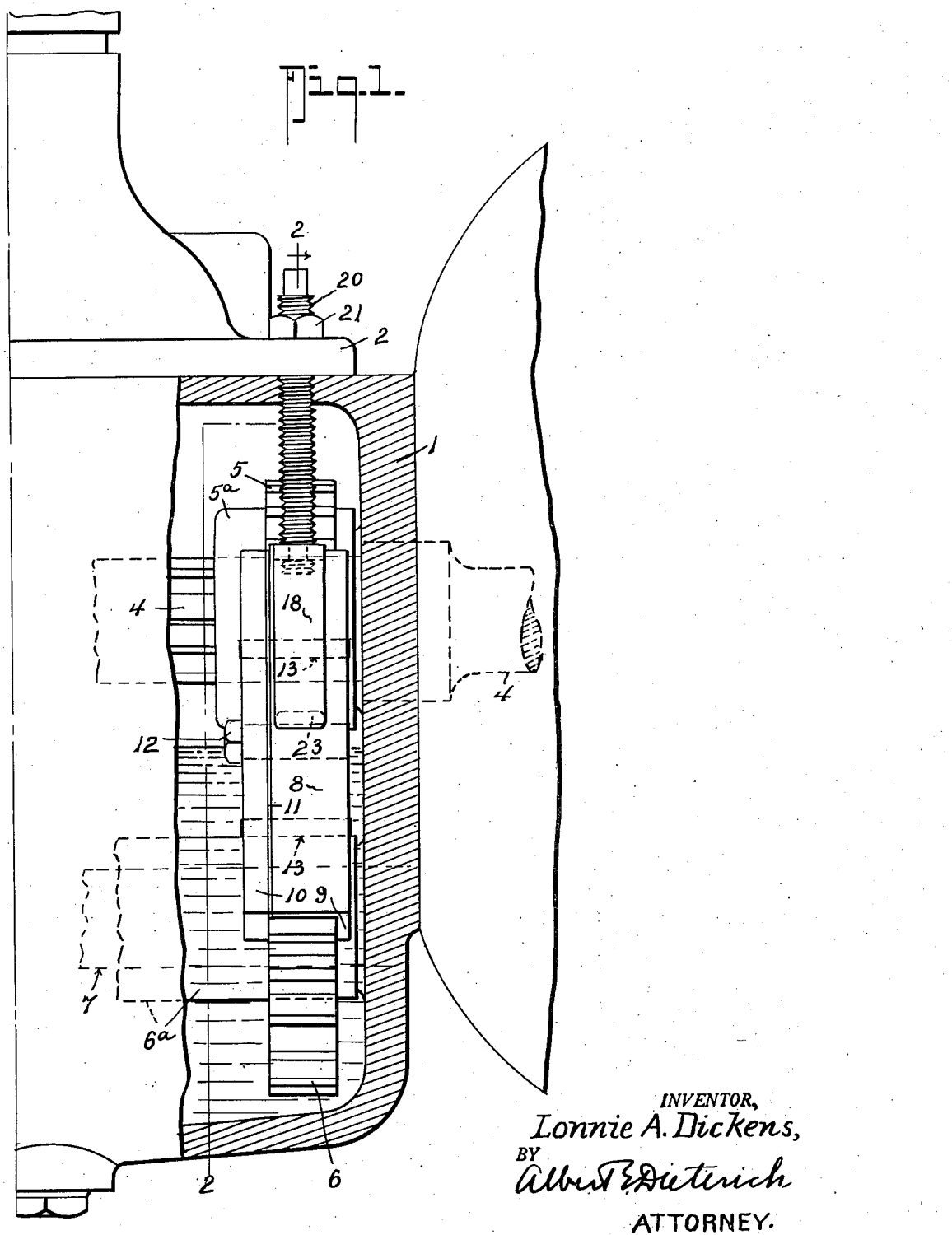
Fig. 1 is a side elevation of a transmission mechanism, part of the housing being broken away to show the application of my invention.

In the drawings in which like numerals of reference indicate like parts in all the figures, 1 represents the conventional transmission housing whose cover 2 is secured in place by cap screws 3. The driving shaft 4 has the usual driving gear 5 which meshes constantly with a countergear 6 on a countershaft 7. The gears 5 and 6 have the usual hubs 5ª, 6ª. All the foregoing parts (1 to 7) are of the usual construction and per se are not of my invention.

My invention comprises, as new articles of manufacture, the parts shown in Figs. 4 to 9 inclusive and the lock screw 17 and nut 18 shown in Figs. 1, 2 and 3. It also comprises those parts in combination with the transmission gears 5 and 6 and their hubs as will more fully appear in the appended claims.

The brake attachment comprises a body which may be constructed of a single piece of metal or of several pieces as may be found most convenient. As illustrated in the drawings, the brake body consists of two pieces of metal, one of which, 8, has a flange 9. The other is a flange plate 10 which is secured to the body 8 by a cap screw 12, a gasket 11 being interposed between the body 8 and plate 10 and guide pins 13 being provided to prevent the plate swivelling on the screw 12.

Each flange 9 and 10 has a curved edge 15 to conform to and fit against the hub of the gears 6 while the body 8 has curved faces 16 and 17 to fit against and conform to the outer edges of the teeth of the gears 5 and 6. The flanges also have edges 14 curved to the curvature of the hub of gear 5 as shown in dotted lines in Fig. 2.

The reason for making the brake body of several parts, rather than one, is that the clearance between the flanges and the sides of the gears may be varied by changing the thickness of gasket 11 and in some cases to facilitate machining. Hereinafter the parts numbered 8 to 11 inclusive shall be considered as a unit and referred to as the brake body.

As will be seen, the brake body constitutes a casing around a portion of the gears 5 and 6 and it is fitted close enough to give a hydraulic fit and thus cooperate with the gears as a gear-type oil pump.

The brake body is held firmly against the gears 5 and 6 by a brake lock 18 in the embodiment illustrated but in some transmission assemblies a set screw passing directly through the housing, or other equivalent means, may be employed for the purpose. The brake lock 18 is a piece of metal of the proper shape and size to fit between the housing bulge 22 and the brake body, thereby holding the brake body firmly against the gears by a wedging action. The brake lock 18 has a heel 23 that engages the brake body and a forked flange 19 to swivelly receive a lock screw 20. The screw 20 is threaded through one of the holes in the cover 2 from which a cover screw has been removed. A nut 21 locks the screw 20 in place and also takes the place of the cover screw, which has been removed, to secure the cover 2 to the housing 1.

When the brake parts are installed as described above they cause the transmission to function in the method and manner as follows:

Gear 5 is driven by the engine through the disengaging clutch and drive shaft 4 and is turned in the direction as indicated by arrows. Gear 6 is in turn driven by gear 5 and turns in the opposite direction as indicated by its arrows. When turning in the directions indicated, the brake mechanism offers no resistance to the movement of the gears but if they start to turn in the opposite direction the transmission grease which surrounds gear 6 is drawn into the space between the gears and the brake body 8 by the open spaces between the teeth of gear 6. However, the grease can not pass on through the curved groove of body 8 because when the teeth of gear 6 mesh with those of gear 5 there is no longer space to convey the grease and as body 8 fits gears 5 and 6 too closely to allow grease to escape therefore the hydraulic pressure produced within the grooves of body 8 by the excessive amount of grease drawn in prevents the gears from turning further in the reverse position but if they are again drawn forward by the engine or other means the excessive grease will be immediately drawn out of the grooves of body 8 by gears 5 and 6 and will not restrain the movement of the gears as excessive grease will not be drawn into the grooves of body 8 when gears 5 and 6 are moving in forward direction because the teeth mesh before, rather than after entering the grooves of body 8.

As this braking action takes place on the driving gears before the releasing or reversing function of the transmission is accomplished by other train of gears the resulting braking action on the driving wheels of the automobile is released or reversed in relationship to the gear setting. For example, when the transmission is set in low, medium or high in forward, the brake allows the car to move forward freely but prevents it from moving backward. When transmission is in neutral the car is not restrained from moving in either direction but when the transmission is set in reverse the car is prevented by the brake from moving forward but is allowed to freely move backward.

In driving a conventional automobile equipped with this device and upon desiring to stop and then start again when going up a hill, the driver would stop as usual by disengaging the clutch and applying the foot brakes. The transmission can then be set in low gear and his foot can then be removed from the brake pedal and used to control the engine because if the car should begin to roll backward this device will immediately restrain it from further backward movement; when the clutch is reengaged the car can be drawn forward up hill by the motor without restraint by this brake. If however the driver desires to move backward down this hill, by leaving the transmission in neutral or shift in reverse he can then move freely in that direction.

This device will also be especially helpful when upon driving down grade it becomes necessary to stop and move backward up the hill. In this case the procedure will be the same as before except when the driver shifts to reverse he may then take his foot off of the brake pedal to operate the throttle and then the car is prevented from rolling forward but is not restrained from moving backward when driven by the motor.

An inherent advantage of this method of braking is that when in low gear or reverse the braking action is greatest on the driving wheels due to the gear ratio but if the motor stalls while climbing a hill in medium or high gears the brake serves as a safety brake to prevent the car from rolling backwards down grade and possibly getting out of control.

If more braking action is needed than this device will provide another one may be used on the gear operating on the back part of the hub of gear 6 which will work in the same manner as the one described, and will work in conjunction with it and supplement its braking action.

If it is desired to render this brake ineffective lock 18 can be drawn away from the brake body and thus allow the body to move slightly away from the gears; then no braking action will take place. If this device is applied either in a vehicle or to any application where it is desired to often release it from action or to use it to retard the backward motion of any gears a conventional train of levers, screws or other devices may be employed to withdraw the brake body 8 either slightly or completely away from its gears so as to allow the passage of grease or any liquid at any rate desired to allow the gears to move backward as the excessive liquid which is carried into the grooves escapes.

From the foregoing description taken in connection with the accompanying drawings it is thought the construction, operation and advantages of the invention will be clear to those skilled in the art to which it relates.

What I claim is:

1. In transmission mechanism wherein is provided a housing containing a lubricant, a driving shaft having a driving gear located within said housing, a countershaft having a countergear meshing with said driving gear and in part at least immersed in said lubricant and a brake body located at one side of and in cooperative association with said gears and defining curved channels through which the respective gear teeth respectively pass, the improvement which comprises an inward projection of said housing defining with said brake body a tapered space, a brake lock longitudinally movable in said tapered space in engagement with said inward projection and said brake body, and means operable from the outside of said housing for moving said brake lock in said space to move said brake body toward said gear or release said body accordingly as said brake lock is moved in one direction or the other.

2. In transmission mechanism wherein is provided a housing containing a lubricant, a driving shaft having a driving gear located within said housing, a countershaft having a countergear meshing with said driving gear and in part at least immersed in said lubricant and a brake body located at one side of and in cooperative association with said gears and defining curved channels through which the respective gear teeth respectively pass, the improvement which comprises an inward projection of said housing defining with said brake body a tapered space, a brake lock longitudinally movable in said tapered space in engagement with said inward projection and said brake body, and means operable from the outside of said housing for moving said brake lock in said space to move said brake body toward said gears or release said body accordingly as said brake lock is moved in one direction or the other, said brake lock comprising an elongated body having a heel at one end to engage said inward projection and said brake body, said operating means including an adjusting screw swivelly connected to the other end of said elongated body and having threaded engagement with said housing.

LONNIE A. DICKENS.

REFERENCES CITED

The following references are of record in the file of this patent:

UNITED STATES PATENTS

| Number | Name | Date |
|---|---|---|
| 1,503,405 | Wheeler | July 29, 1924 |
| 1,692,801 | Jensen | Nov. 11, 1928 |